United States Patent
Sogomonyan et al.

(10) Patent No.: US 7,818,656 B2
(45) Date of Patent: Oct. 19, 2010

(54) CIRCUIT FOR COMPARING TWO N-DIGIT BINARY DATA WORDS

(76) Inventors: Egor Sogomonyan, Jakob Von Gundling-Strasse 6, Potsdam (DE) 14469; Michael Gössel, Max-Planck-Strasse 16, Mahlow (DE) 15831

( * ) Notice: Subject to any disclaimer, the term of this patent is extended or adjusted under 35 U.S.C. 154(b) by 238 days.

(21) Appl. No.: 11/909,148

(22) PCT Filed: Jan. 26, 2006

(86) PCT No.: PCT/DE2006/000117

§ 371 (c)(1),
(2), (4) Date: Apr. 29, 2008

(87) PCT Pub. No.: WO2006/099822

PCT Pub. Date: Sep. 28, 2006

(65) Prior Publication Data

US 2009/0289663 A1    Nov. 26, 2009

(30) Foreign Application Priority Data

Mar. 24, 2005    (DE) .................. 10 2005 013 883

(51) Int. Cl.
*G06K 11/00* (2006.01)
(52) U.S. Cl. .................. 714/816; 714/817; 326/52; 326/104
(58) Field of Classification Search .................. 326/52, 326/104; 714/816, 817
See application file for complete search history.

(56) References Cited

U.S. PATENT DOCUMENTS

| 2004/0066213 | A1* | 4/2004 | Kwak et al. .................. 326/52 |
| 2006/0022864 | A1* | 2/2006 | Lee .................. 341/169 |
| 2007/0063742 | A1* | 3/2007 | Janssen et al. .................. 327/57 |
| 2008/0059853 | A1* | 3/2008 | Ushikubo .................. 714/726 |

FOREIGN PATENT DOCUMENTS

WO    WO 2006/099822 A1    9/2006

OTHER PUBLICATIONS

Kundu, et al., "Embedded Totally Self-Checking Checkers: A Practical Design," IEE Design & Test of Computers, IEEE Service Center, Aug. 1990, 7(4), 5-12.
Kundu, et al., "Self-Checking Comparator with One Periodic Output," IEEE Transactions on Computers, IEEE Service Center, Mar. 1996, 45(3), 379-380.
Lala, et al., "A Unified Approach for Off-line and On-line Testing of the VLSI Systems," Proceedings of Defect and Fault Tolerance in VLSI Systems IEEE International Symposium, Nov. 1996, 195-203.

(Continued)

*Primary Examiner*—Rexford N Barnie
*Assistant Examiner*—Jany Tran
(74) *Attorney, Agent, or Firm*—Woodcock Washburn LLP (57) ABSTRACT

The invention relates to a circuit for comparing two n-digit binary data words $x[1](t), \ldots, x[n](t)$ and $x'[1](t), \ldots, x'[n](t)$, which in the error-free case are either identical or inverted bit-by-bit with respect to each other, with a series connection of a combinatorial circuit for implementing a first combinatorial function, a controllable register and a combinatorial circuit for implementing another combinatorial function.

16 Claims, 6 Drawing Sheets

OTHER PUBLICATIONS

Matakias, et al., "Ultra Fast and Low Cost Parallel Two-rail Code Checker Targeting High Fan-in Applications," VLSI, Proceedings of IEEE Computer Society Annual Symposium, IEEE Comp. Soc, Feb. 2004, 293-296.

PCT International Search Report mailed Jun. 2, 2006, in corresponding International Application No. PCT/DE2006/000117.

Saposhnikov, et al., "Necessary and Sufficient conditions for the Existence of Totally Self-Checking Circuits," IOLTS, Proceedings of the VLSI Test Symposium, 10th IEEE International, Jul., 2004, 25-30.

Tarnick, "Controllable Self-Checking Checkers for Conditional Concurrent Checking," Proceedings of VLSI Test Symposium, 12th IEEE Comp. Soc., Apr. 1994, 144-150.

* cited by examiner

CIRCUIT FOR COMPARING TWO N-DIGIT BINARY DATA WORDS

The invention relates to the field of testing and monitoring digital circuits.

BACKGROUND ART

Owing to the large scale integration of electronic circuits the error proneness and the error rate in electronic circuits are increasing so that, in particular, for security-critical applications the circuits are increasingly doubled or doubled so as to be inverted or are realized in so-called "two rail" logic. Then the outputs of the doubled circuits or the circuits that are doubled so as to be inverted are compared in a unit that is called the comparator. In the event of a disparity the signals that are to be compared generate an error signal. If the outputs that are doubled so as to be inverted are compared, such a comparator is called the "two rail tester" or "two rail checker". A "two rail checker" sends an error signal, if the signals to be compared are not inverted (bit-by-bit) in relation to each other. In the event of error-free, identical signals a faulty output signal will indicate only that there is some kind of difference in the two input signals. At the same time the noisy bit position cannot be inferred, a state that is a drawback.

If there are errors in the comparator, it can happen that the faulty comparator cannot indicate, for example, any errors that may occur in the circuits to be compared, a feature that must be ruled out, in particular, in security-critical applications. Therefore, an important goal to be achieved in the design of comparators is that internal errors of the comparator are detected during continuous operation. If a comparator compares two signals, which are identical in the error-free case, then as long as no errors occur in the circuits to be monitored, the same input values are always present at the two inputs of the comparator. Hence, the number of possible input values for the comparator is very limited, in particular to the input values that are identical at both inputs of the comparator. For specific circuits that are to be compared, the number of possible input values for the comparator is even smaller, since of the circuits to be monitored only a subquantity of the output values that are possible in principle is generated.

Therefore, the problem that must be solved when designing a comparator is to detect the maximum number of internal errors of the comparator when the minimum number of correct input values (that is, the same input values or input values that are inverted bit-by-bit in relation to each other) are available at the output of the comparator. Furthermore, the object is also to be able to test any non-detected errors at a low cost. When two signals are compared, one must make eventually a binary decision—0 or 1—whether these signals are identical or not. Therefore, comparators with a binary output are especially interesting.

For such comparators it is especially important that any error, occurring at its output, for example, a "stuck at"—0/1 error—is easily detected or easily tested, since in the event of such an error no other error in the circuits or the signals to be compared can be detected. There exists a comparator with one output, as described, for example, by Kusko, M. al.: "99% AC test coverage using only LBIST on the 1 GHz IBM S/390 zSeries 900 Microprocessor", Proc. ITC, pp. 586-592, 2001. The identical signals to be compared in the error-free case are wired XNOR to XNOR gates by means of components; and the outputs of the FOR signals are wired AND to an error signal. In the absence of errors the outputs of the XNOR gates are equal to 1. A value 0 at an output of at least one NOR gate indicates an error. If an error occurs in the input signals to be compared, then the comparator sends the value 0; and in the absence of errors the value 1 is sent. The drawback with this comparator is that the test of the possible errors is time intensive and demands, in particular, a large number of test inputs, as described by Kusko, M. et al. In particular, it is difficult to detect a "stuck at 1" error at the output, since the two inputs of the comparator are connected to the outputs of identical circuits, which in the absence of errors send the same values, which always give a reason for an output 1 of the comparator.

In order to improve the testability of the comparator, Kundu, S. et al.: "Self-checking Comparator with one Periodic Output", IEEE Trans. Comp., Vol. 45, pp. 379-380, 1996, suggest a comparator with one periodic output, which also indicates its internal errors during continuous operation in that the output is not periodic. The drawback with this comparator is that a special CMOS element has to be used that is not available especially if the comparator is supposed to be designed with a commercially available design tool. Another drawback—especially at very high clock rates—is the high energy consumption as a result of the periodic and dynamic behavior of the comparator as well as the non-static output.

Other comparators with a non-static periodic output are described, for example, in Metra, C. et al.: "Highly Testable and Compact Single Output Comparator", Proc. VLSI Test Symposium, pp. 210-215, 1997, and Matakias, S. et al.: "Ultra Fast and Low Cost Parallel Two Rail Checker Targeting High Fan-In Applications", IEEE CS Annual Symposium on VLSI(ISVLSI), pp. 293-296, 2004. Even these comparators require special elements, which usually cannot be realized with a commercial design tool; and they exhibit a periodic, non-static output, features that constitute a drawback.

THE INVENTION

The invention is based on the problem of providing a gate-based circuit for comparing two n-digit binary data words. Such a circuit detects the maximum number of internal errors during continuous operation and can test non-detected errors at a low cost during continuous operation. In addition, in the event of an error the faulty bit positions of the input signals to be compared shall be determined at a low cost.

The invention solves this problem with a circuit for comparing two n-digit binary data words, as disclosed in the independent claim 1. Advantageous embodiments of the invention are the subject matter of the dependent claims.

With the aid of the inventive circuit [sic] can be designed in commercially available design tools. In contrast, prior art comparators with one output require specific circuit elements, which are to be implemented on the transistor level and which are not present in commercially available design tools.

The total testability of the inventive circuit for all single "stuck at" errors is achieved by means of additional control signals x[0] of the combinatorial function f1 and of the controllable register even for the same or bitwise inverted input signals. Since a comparator for comparing two binary data words is usually connected to the output side of two identical systems with identical output signals or to two systems with bitwise inverted output signals, this property of the circuit, according to the invention, is very advantageous. Thus, for example, the especially important testability of its single output for a "stuck at" error by simply changing the binary control signal x[0] of the combinatorial function f1 is a given; and the errors, which are not detected during continuous operation in the combinatorial circuit for implementing the combinatorial function g, can be easily detected in a test operating mode in that the few necessary test vectors for these errors are inputted into the controllable register.

Similarly the results of the test of the combinatorial circuit for implementing the combinatorial function f1 can be easily evaluated by outputting the values, stored in the flip-flops of the controllable register. In the event of an error, the bits, which are faulty compared to the two data words, are localized by simply outputting the respective memory contents of the controllable register. Thus, for circuits with a high clock rate, the controllable register can also be used advantageously as the pipeline register.

EMBODIMENTS OF THE INVENTION

The invention is explained in detail below by means of the embodiments with reference to the figures in the drawings.

Figure 1:
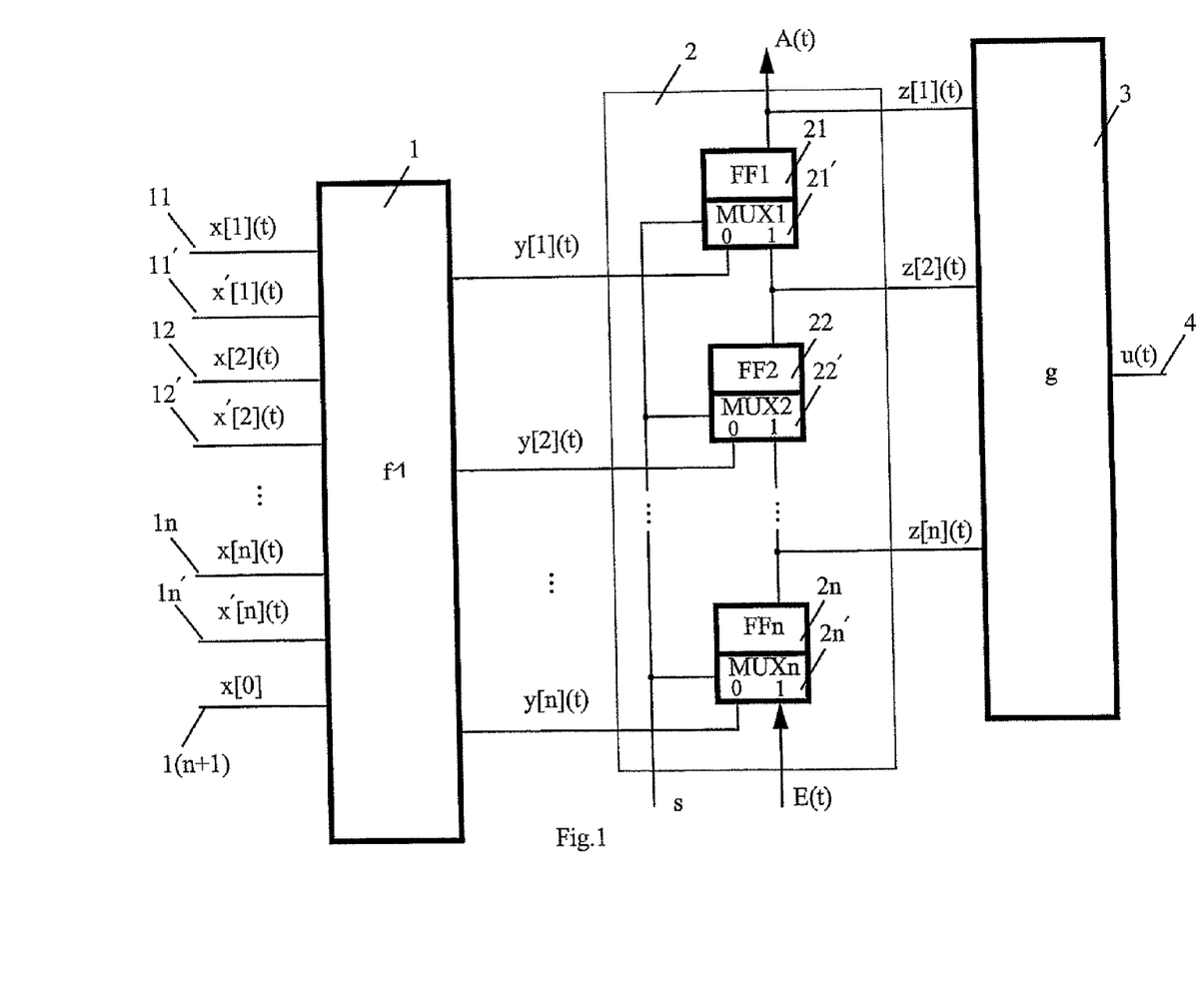
FIG. 1 is a schematic drawing of a block diagram for a comparator.

FIG. 1 is a block diagram of a comparator with 2n+1 inputs 11, 11', . . . , 1n, 1n', 1(n+1) for comparing two n-digit binary input words $x[1](t), \ldots, x[n](t)$ and $x'[1](t), \ldots, x'[n](t)$, which in the absence of errors are either identical or are bitwise inverted with respect to each other. The comparator of FIG. 1 comprises a series connection of a circuit 1 for implementing a combinatorial function f1, a controllable register 2 and a circuit 3 for implementing a combinatorial function g. The circuit 1 exhibits 2n+1 inputs 11, 11', . . . , 1n, 1n', 1(n+1), which are also the inputs of the comparator, so that for i=1, . . . , n components $x[i](t)$ of the first input word are available at the inputs 1j, and the components $x'[i](t)$ of the second input word are present at the inputs 1j'. An additional control signal $x[0]$ is available at the input 1(n+1).

Binary signals $y[1](t), \ldots, y[n](t)$ are outputted at the n outputs of the circuit 1, thus realizing the circuit 1 in such a manner that for j=1, in $$y[j](t)=x[j](t)\oplus x'[j](t)\oplus x[0]\oplus i[f] \quad (1)$$

holds true.

In this respect $\oplus$ stands for the logical XOR or the exclusive OR operation; and $i[f]$ stands for a binary constant 0 or 1, which is determined by the way that the circuit 1 is realized with XOR or XNOR elements.

The implementation of the equation (1) on the basis of specific components, for example with XOR elements or NOR elements, is known to the skilled person as such. The controllable register 2 comprises n flip-flops FF1 21, FF2 22, . . . , FFn 2n and n multiplexers MUX1 21', MUX2 22', . . . MUXn 2n'. For k=1, . . . , n is an output of the multiplexer MUXk 2k' is connected to the data input of the flip-flop FFk 2k. FIG. 1 shows very clearly that the multiplexer MUXk is arranged directly in front of the flip-flop FFk.

For k=2, . . . , n the data output of the flip-flop FFk, which carries the signal $z[k](t)$, is routed simultaneously into the 1-input of the multiplexer MUX(k−1) 2(k−1) and into the k-th input of the circuit 3. The output of the first flip-flop FF1 21 is connected simultaneously to the output of the controllable register 2 that carries an output value $A(t)$ and is connected to the first input of the combinatorial circuit 3, said input carrying the signal $z[1](t)$. The 1-input of the multiplexer MUXn 2n' is connected to the input of the controllable register 2, said input transmitting the input signal $E(t)$.

For k=1, . . . , n the output of the combinatorial circuit 1 that transmits the signal $y[k](t)$ is connected to the 0-input of the multiplexer MUXk 2k' of the controllable register 2, which connects its 0-input or its 1-input to its output as a function of the binary control value $s \in \{0, 1\}$. The result is that the controllable register 2 is set up logically like a so-called scan register. The skilled person can choose, depending on the available technology, a suitable implementation of scan flip-flops of the controllable flip-flop elements, which are described here as a series connection of multiplexers and flip-flop elements, and for which examples are given in Abramovici, M. et al.: "Digital Systems Testing and Testable Design", Computer Science Press, 1990.

The combinatorial circuit 3 in FIG. 1 implements an n-digit Boolean function $g(z[1](t), \ldots, z[n](t))=u(t)$ with a determining value or controlling value ("controlling value") c[g] and an inversion value i[g]. The two-digit or multi-digit functions or their allocated gates AND, NAND, OR and NOR are assigned, as well known, determining values ("controlling values") and inversion values. Thus, for the functions or gates AND and NAND the determining value is equal to 0; and for the functions or gates OR and NOR, the determining value is equal to 1. The inversion values for the functions or gates AND and OR are 0; and for the functions or gates NAND and NOR the inversion values are equal to 1.

If the determining value c[h] of a function or a gate h is available at least at one input of this function, then the output of this function is found for $c[h] \oplus i[h]$ if i[h] denotes the inversion value of the function or the gate h. If all possible inputs of the function or gate h are assigned the NAND determining value c[h]-bar, the output of this function is found for $c[h]\text{-bar}\oplus i[h]$. Since, for example, the determining value of an AND function c[AND] is equal to 0 and the inversion value i[AND] of this function is also equal to 0, the output of an AND gate, for example with m, m≧2, inputs is equal to 0, since $0\oplus0=0$, when a 0 is present and equal to 1 only at least at one input of an AND function, since $0\oplus1=1$, if the binary value 1, which is the NAND determining value c(AND)-bar of the AND gate, is available at all inputs of the AND function. Determining values ("controlling values") and inversion values of Boolean functions are known to the skilled person and are also described, for example, in Abramovici, M et al.: "Digital Systems Testing and Testable Design", Computer Science Press, 1990.

Given the determining value c[g] and the inversion value i[g] it holds for the Boolean function g of the circuit 3 for any arbitrary binary n-type $z[1](t), \ldots, z[n](t)$ with $c[g], \ldots, c[g]\neq z[1](t), z[n](t)$, so that $$g(c[g]\text{-bar}, \ldots, c[g])\text{-bar}=c[g]\text{-bar}\oplus i[g]\neq \\ g(z[1](t), \ldots, z[n](t))=c[g]\oplus i[g] \quad (2)$$

is true.

When two input words that are identical in the error-free case are compared, the value $x[0]$ of the control signal for the (n+1)-th input of the combinatorial circuit 1 is found for $$x[0]i[f]\oplus c[g]\text{-bar} \quad (3)$$

and when signals that in the error-free case are inverted bit-by-bit with respect to each other are compared, said value is found for $$x[0]=i[f]\oplus c[g] \quad (4).$$

The result is that, the value $u(t)=c[g]$-bar $\oplus i[g]$ is outputted at the output of the combinatorial circuit g, if there is no error and if the value s of the control signal of the controllable register 2 is equal to 0. If an arbitrary error is present at the inputs 11, 11', 12, 12', ... 1n, 1n' of the comparator, then the value $u(t)$-bar=$c[g]\oplus i[g]\neq u(t)$ is outputted at the output of the comparator so that the error is detected.

Figure 2:
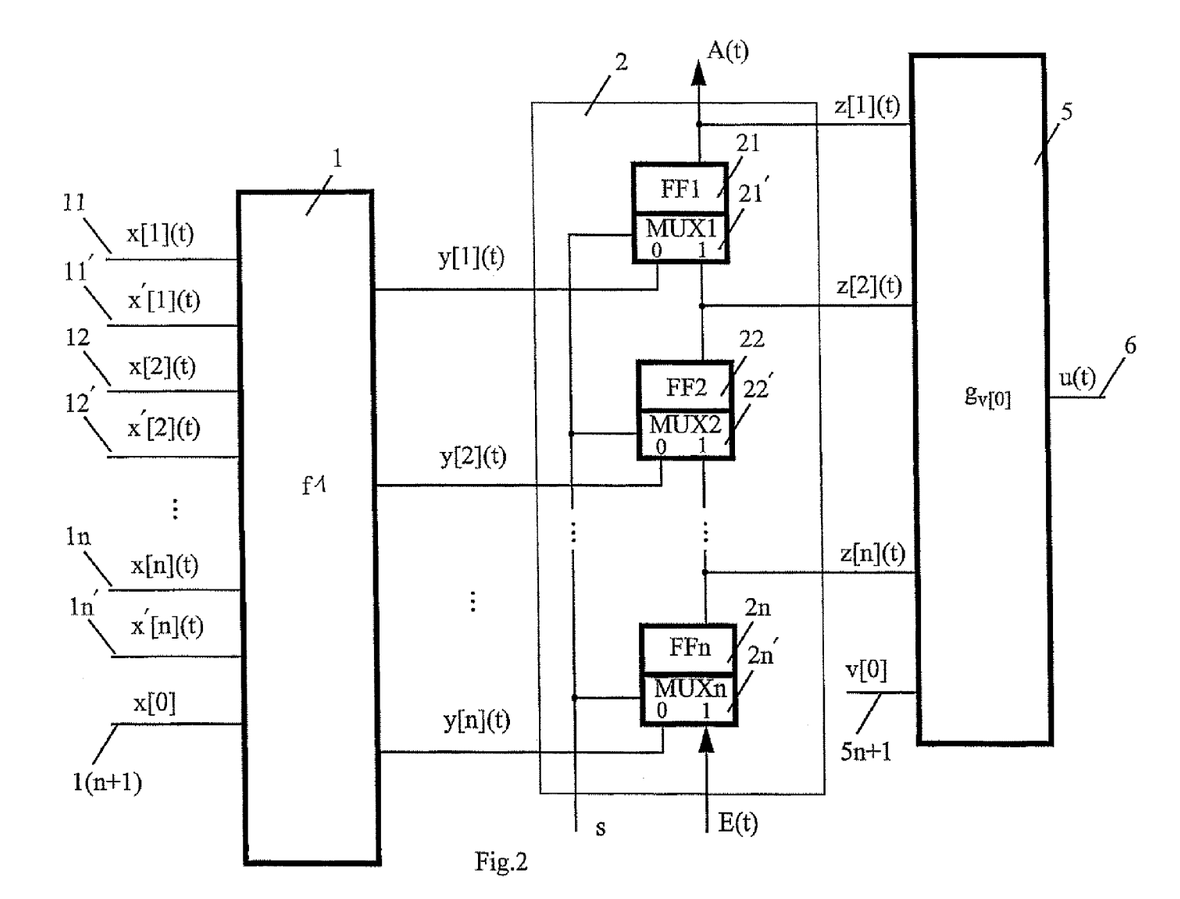
FIG. 2 is a schematic drawing of a block diagram for another comparator.

FIG. 2 is a block diagram of another comparator, which differs from the comparator, described in FIG. 1, in that the circuit 3 for implementing the combinatorial function g in FIG. 1 was replaced by a circuit 5 for implementing a function $g_{v[0]}$. At the same time the function $g_{v[0]}$ in FIG. 2 differs from the combinatorial function g in FIG. 1 in that it has an additional binary control input v[0] and in that the combinatorial circuit 5 depends on an additional control input.

In the case of identical circuit elements the same reference numerals as in FIG. 1 are used for the circuit in FIG. 2, for which reason such circuit elements are not described once again. The determining value $c[g_{v[0]}]$ and the inversion value $i[g_{v[0]}]$ of the function $g_{v[0]}$, which is implemented by the circuit 5, depend on the value of the control variable v[0]; and at this stage the Boolean function $g_{v[0]}$ must be found in such a way that, instead of the equation (2) for $(c_{v[0]}$-bar, ..., $c_{v[0]}$-bar$)\neq(z[1](t), ..., z[n](t))$ $$g_{v[0]}(c_{v[0]}\text{-bar}, \ldots, c_{v[0]}\text{-bar})=c_{v[0]}\text{-bar}\oplus i[g_{v[0]}]\neq g_{v[0]}(z[1](t), \ldots, z[n](t))=c_{v[0]}\oplus i(g_{v[0]}) \quad (5)$$

holds true.

When two input words that are identical in the error-free case are compared, the value x[0] of the control signal for the (n+1)-th input of the combinatorial circuit f1 is now found for $$x[0]=i[f]\oplus c\text{-bar}[g_{v[0]}] \quad (6)$$

and when signals that in the error-free case are inverted bit-by-bit with respect to each other are compared, said value is found for $$x[0]=i[f]\oplus c[g_{v[0]}] \quad (7).$$

The result is again that the value $u(t)=c[_{v[0]}]$-bar$\oplus i[g_{v[0]}]$ is outputted at the output of the combinatorial circuit 5 for implementing the function $g_{v[0]}$, if there is no error and if the value of the control signal s of the controllable register 2 is equal to 0.

Figure 3:
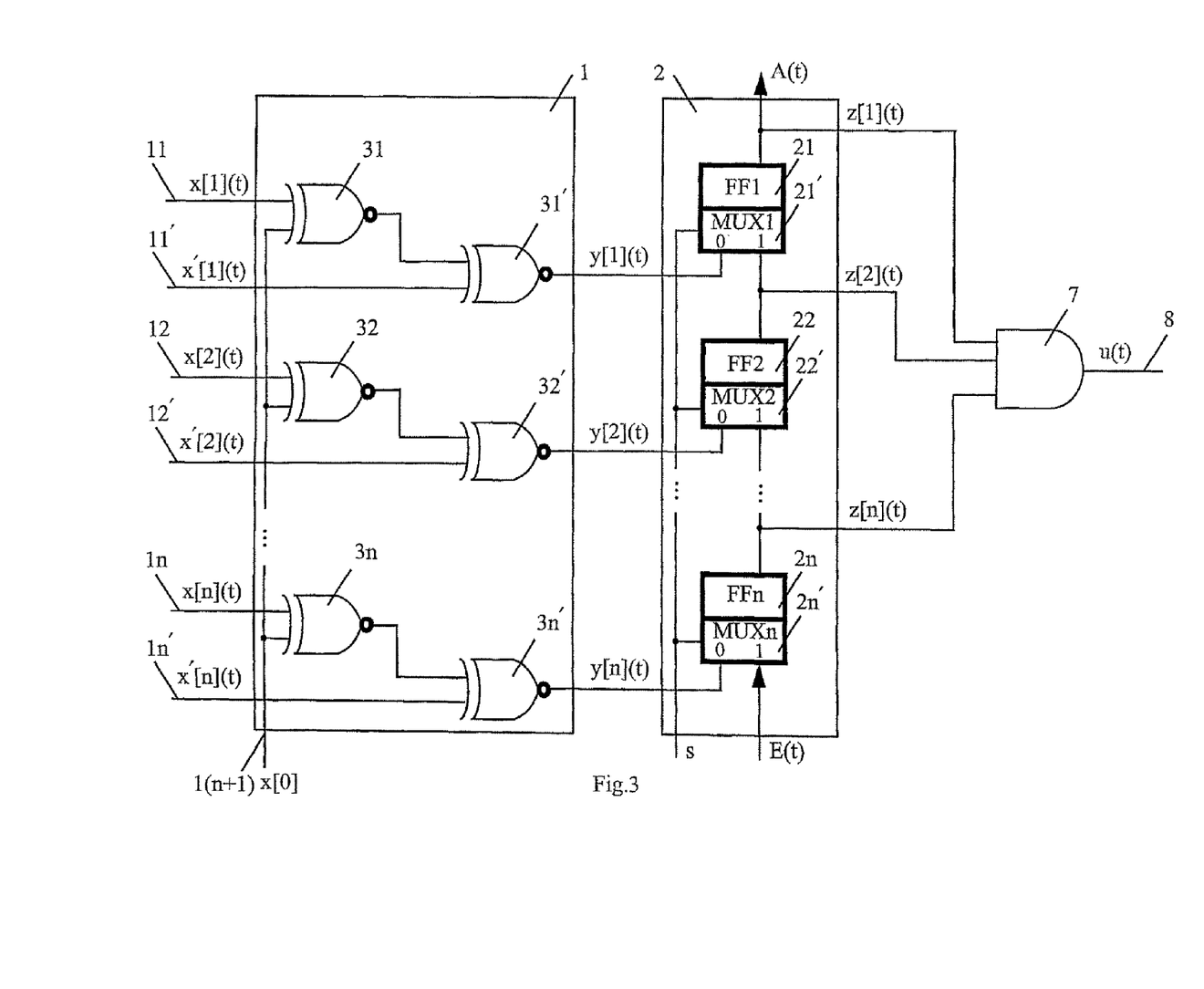
FIG. 3 depicts an embodiment of the comparator, according to FIG. 1.

FIG. 3 is an embodiment of the comparator, according to FIG. 1. For j=1, ..., n the input line 1j, carrying the input signal x[j](t), is routed into the first input of the NOR gate 3j, at whose second input the input, which transmits the control signal x[0], is present; and whose output is routed into the first input of the XNOR gate 31', with whose second input the input line 1j', which carries the input signal x[j](t), is connected and whose output, transmitting the signal y(j)(t), is transmitted into the 0-input of the multiplexer MUXj 2j' of the controllable register 2. The circuit 3 for implementing the combinatorial function g in FIG. 1 is implemented here with an AND gate 7, whose 1st input for 1=1, ..., n is connected to the output of the controllable register 2 that carries the binary value z[1](t) and whose output transmits the value u(t) as the error signal.

The binary constant i[f] in equation (1) above is equal here to 0. If the value 0 is available at an input of the AND gate 7, then the value u(t) is equal to 0, irrespective of all other values, which are available at the inputs of the AND gate 7; and the determining value c[AND] of the AND gate 7 is apparently equal to 0.

Therefore, when two input words, which are identical in the error-free case, are compared, the value of the control signal is, according to equation 2, x[0]=1; and, when the input words, which are bitwise inverted in the error-free case, are compared, x[0]=0 must be selected according to equation (4).

The result is that even though the comparator is embedded as a part of a whole system and only a very limited quantity of input signals is available at its inputs, as in the case of any comparator, the distinction between this comparator and the comparator, used by Kusko, M., Robbins, B., Koprowski, T., Huott, W. in "99% AC test coverage using only LBIST on the 1 GHz IBM S/390 zSeries 900 Microprocessors, Proc. ITC, pp. 586-592, lies in the ease with which it can be tested in an advantageous manner. If, for example, two identical systems are monitored with a comparator by comparing their outputs, the same values x[2](t)=x'[2](t) are available at all of the respective outputs, for example, the outputs, which are connected to the inputs 12 and 12' of the comparator in FIG. 3, at any time t in the error-free case. Then either x[2](t)=x'[2](t)=0 or x[2](t)=x'[2](t)=1.

Since, as the skilled person knows, in order to test the XOR gates all possible four input combinations 00, 01, 10, 11 must always be available at the inputs of the XOR gate to be tested, the comparator which is presented here, as compared to conventional comparators, is possible because the value of the control signal x[0] is varied.

The result of the tests can be evaluated in a simple way with the aid of the controllable register. If x[2](t)=x'[2](t)=0 hold true, then for x[0]=0 both the XOR gate 32 and the XOR gate 32' are tested with the available input 00. For x[0]=1 the XOR gate 32 is tested with 01; and the XOR gate 32' is tested with 10.

If x[2](t)=x'[2](t)=1, then for x[0]=0 the XOR gate 32 is tested with 10; and the XOR gate 32' is tested with 11. For x[0]=1, the XOR gate 32 is tested with 11; and the XOR gate 32' is tested with 01. The result is that the XOR gates 32 can be tested in a significantly simple way by changing the control signal x[0]. In so doing, it is especially important that the results of these tests can be stored in the flip-flops FF1 21, ..., FFn 2n of the controllable register 2 and can be outputted for evaluation, said flip-flops being connected to the output side of the XOR gates 31, ..., 31', 3n, 3n'.

Similarly the n required test inputs 011 ... 1, 101 ... 1, ..., 11 ... 10 for the single "stuck at 1" errors of the inputs of the AND gate 7 can be easily inputted into the controllable register 2, whereas during continuous operation the single "stuck at 0" errors at the inputs of the AND gate 7 can be detected. The most serious error is a "stuck at 1" error at the output 8 of the AND gate 7. If there is such an error, then the comparator indicates—independently of an error of the system to be monitored—a correct behavior of the whole system, so that a timely detection of errors of the system to be monitored is not possible.

If at this stage in the comparator the control signal x[0] is changed from the value 1 to the value 0, for example, for one cycle, then the comparator transmits the value 0 in this cycle if there is no "stuck at 1" error at its output. If there is a "stuck at 1" error at the output 8, then the output 8 stays at the value 1; and a single "stuck at 1" error at the output can be easily detected in this way, a feature that is advantageous. In addition, it is advantageous, especially for the very high clock rate of modern electronic circuits, which lie in the gigahertz range, that the controllable register 2 improves not only the testability of the comparator, but can also take over at the same time the function of a pipeline register.

Figure 4:
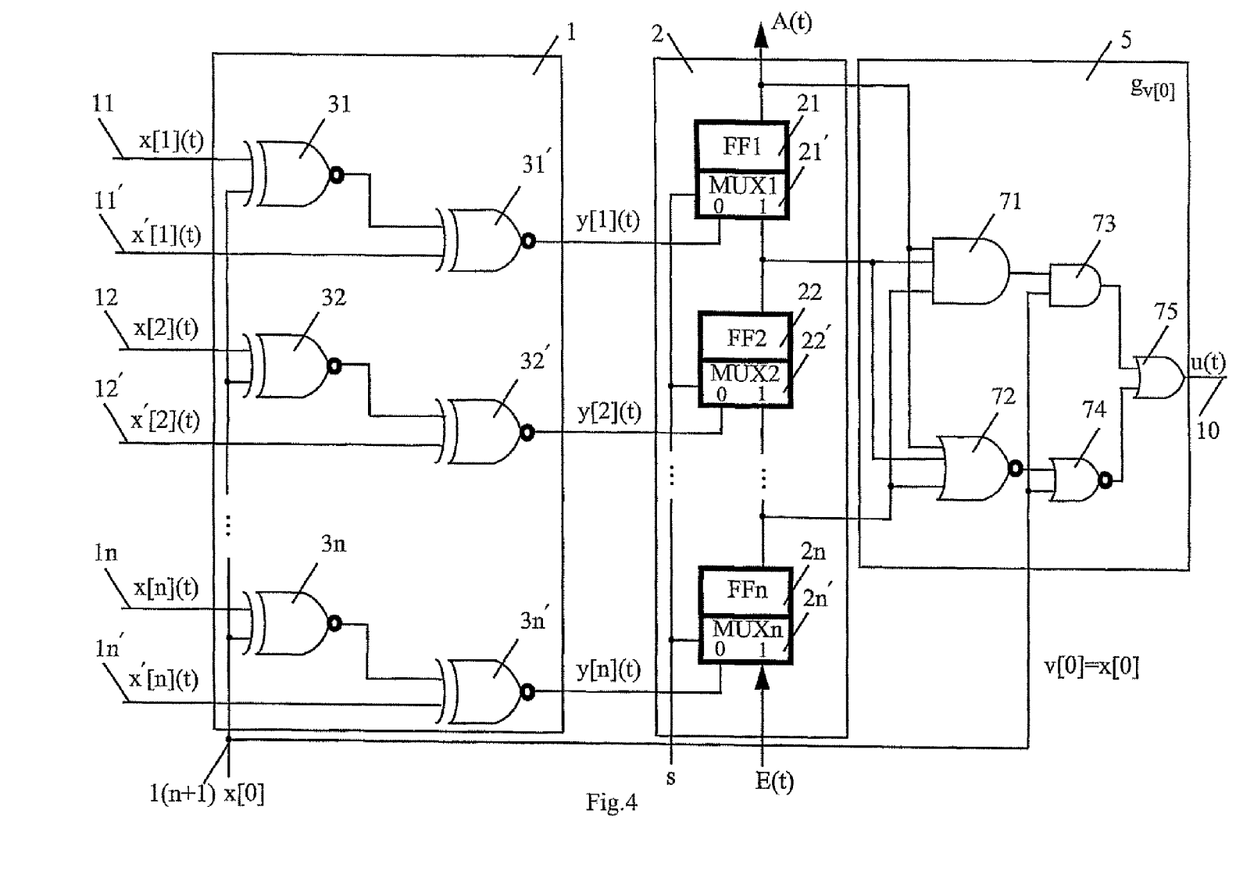
FIG. 4 depicts an embodiment of the other comparator, according to FIG. 2.

FIG. 4 depicts an embodiment of the comparator in accordance with FIG. 2. For j=1, ..., n the input line 1j, which carries the input signal x[j](t), is routed into the first input of the FOR gate 3j, at whose second input the input, transmitting the control signal x[0], is present; and whose output is routed into the first input of the FOR gate 31', with whose second input the input line 1j', carrying the input signal x[j](t), is connected, and whose output, carrying the signal y(j)(t), is routed into the 0-input of the multiplexer MUXj 2j' of the controllable register 2.

The circuit for implementing a function $g_{v[0]}$ in FIG. 3 is realized by the AND gates 71 and 73, the OR gate 75 and the NOR gates 72 and 74. For l=1, . . . , n the output of the controllable register 2 that transmits the signal z[l](t) is connected to both the 1-st input of the AND gate 71 and to the 1-st input of the NOR gate 72. The output of the AND gate 71 is connected to the first input of the AND gate 73; and the output of the NOR gate 72 is connected to the first input of the NOR gate 74. The input 1(n+1), carrying the control signal x[0], is connected simultaneously to the control input of the combinatorial function $g_{v[0]}$, which is routed into the respective second inputs of the AND gate 73 and the NOR gate 74. The output of the AND gate 73 is connected to the first input of the OR gate 75, whereas the second input of the OR gate 75 is connected to the output of the NOR gate 74. The output of the OR gate 75 transmits the error signal.

At this stage the function of the comparator in FIG. 4 shall be illustrated in even greater detail as an example of how the comparator works. Here, again the binary constant i[f] in equation (1) is equal to 0. The result is that the determining value c[AND] of the AND gate 71 is equal to 0, whereas the determining value c[NOR] of the NOR gate is equal to 1. If the value of the control signal x[0] is equal to 0, then the output of the NOR gate 72 is passed on over the NOR gate 74 and over the OR gate 75 to the output of the comparator that carries the value u(t) as the output signal, whereas the output of the AND gate 71 is always set to the value 0 by means of the AND gate 73 and cannot make a contribution to the value u(t).

If the value of the control signal x[0] is equal to 1, then the output of the AND gate 71 is passed on over the AND gate 73 and over the OR gate 75 to the output of the comparator that carries the value u(t), whereas the output of the NOR gate 72 is always set to the value 0 by means of the NOR gate 74 and cannot make a contribution to the value u(t) at the output of the comparator.

Let us assume as an example that two input signals, which are identical in the error-free case, are to be compared. The result is that then for l=1, . . . , n the values y[l](t) are equal to x[0] as long as no error occurs. It holds that z[l](t)=y[l](t−1)=x[0], and n identical values x[0] are available at the inputs of the AND gate 71 and the NOR gate 72. If x[0]=1, then the output of the AND gate 71, at whose inputs in the error-free case n values 1 are available, is routed over the AND gate 73 and the OR gate 75 to the output 10; and c[0]=0 is the determining value of the function $g_{v[0]}$ where v[0]=x[0] for the control input v[0]=x[0]=0.

If x[0]=0, then the output of the NOR gate 72, at whose inputs then in the error free case n values 0 are available, is routed over the NOR gate 74 and the OR gate 75 to the output 10; and c[1]=1 is the determining value for the control input 1. In this case then the value 1 is outputted at the output 10 of the comparator.

The result is that the value u(t) of the output of the comparator is changed by changing the value of the control input x[0] without the comparator losing its property of being able to detect errors at its inputs. Thus, it is possible to test the output of the comparator for errors during its operation without having to turn off the comparator, a feature that is advantageous. The result is also that all "single stuck at 0/1" errors of all gates, except for the "stuck at 1" errors at the inputs of gate 71 and except for "stuck at 0" errors at the inputs of the gate 72, can be detected during operation thereof, if identical input signals were entered, and if the input values of the comparator are not constant and if the control signal x[0] is changed from time to time.

In order to test the single "stuck at 1" errors at the inputs of gate 71, n different assignments (0 1 . . . , 1), (1 0 1 . . . , 1), . . . , (1 . . . , 1, 0) can be easily inputted into the controllable register 2 during test mode and applied to the combinatorial circuit 3. Correspondingly to test the single "stuck at 0" errors at the inputs of the gate 71, n different assignments (1 0 . . . , 0), (0 1 0 . . . , 0), . . . , (0 . . . , 0 1) can be easily inputted into the controllable register 2 during test mode and applied to the combinatorial circuit 3.

If signals, which were inverted bit-by-bit in the error-free case, were to be monitored with the comparator, then the lines, carrying the control signals x[0] and v[0], ought to be connected simply by means of a NOT element.

Figure 5:
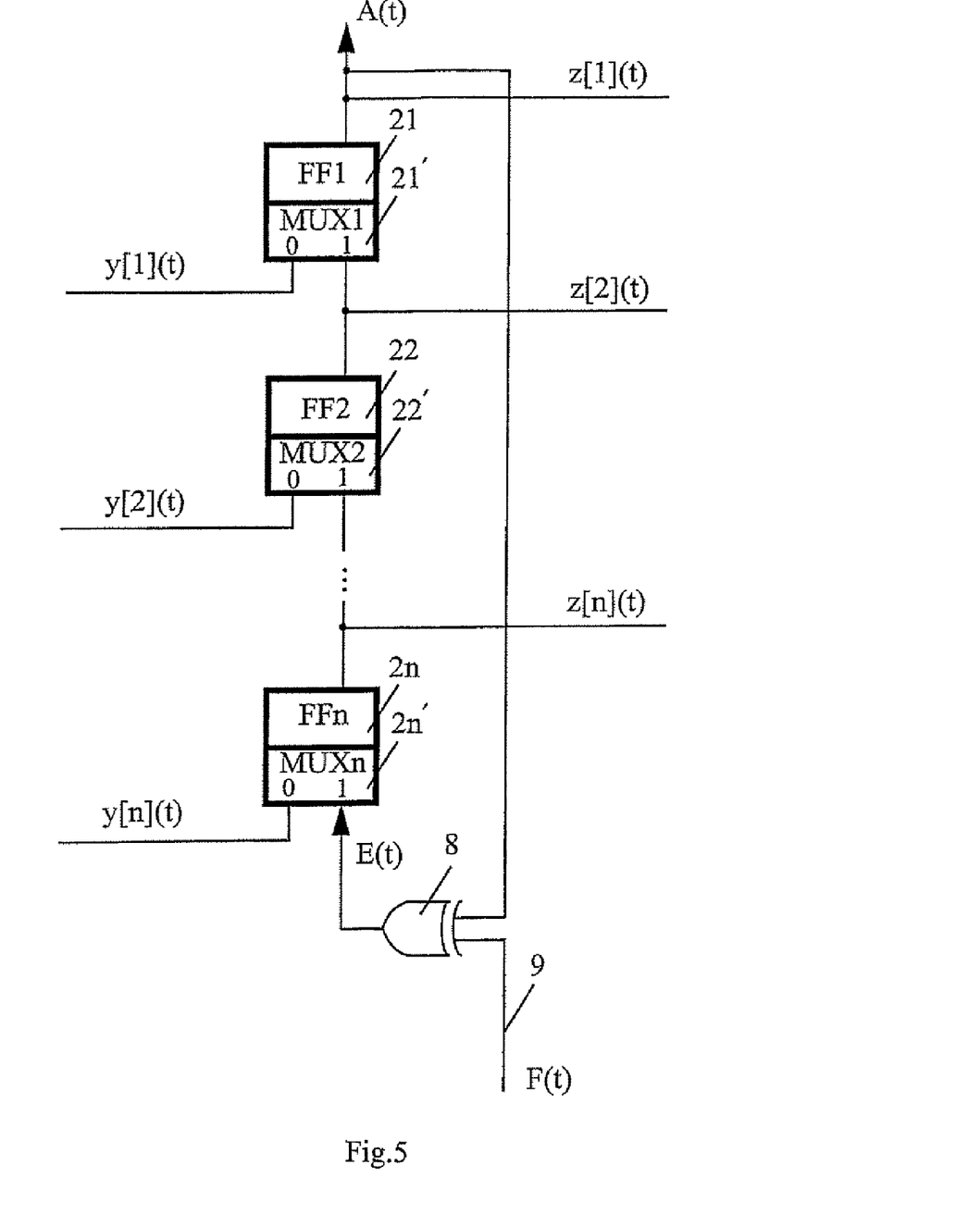
FIG. 5 depicts an embodiment of a controllable register, according to FIGS. 1 and 2.

FIG. 5 depicts an embodiment of the controllable register 2 in FIGS. 1 and 2. The output of the flip-flop 21 that carries the output value A(t) is connected to the first input of an XOR element 8, whose output is connected to the 1-input of the multiplexer 2n'. The input 9 of the controllable register that carries the signal F(t) is connected to the second input of the XOR gate 8. If the flip-flops FF1 21, . . . , FFn, 2n are in the state 0 owing, for example, to a reset and if a single value 1 is entered by way of the input 9, then the assignments (0, . . . , 0, 1) . . . , (1, 0, . . . , 0) of the register 2 that are necessary to test the single "stuck at 0" errors of the NOR gate 72 can be easily generated by means of (cyclical) shifting.

Starting from an assignment (1, . . . , 1, 0), the corresponding assignments to test the single "stuck at 1" errors for gate 71 can also be generated by means of (cyclical) shifting.

Figure 6:
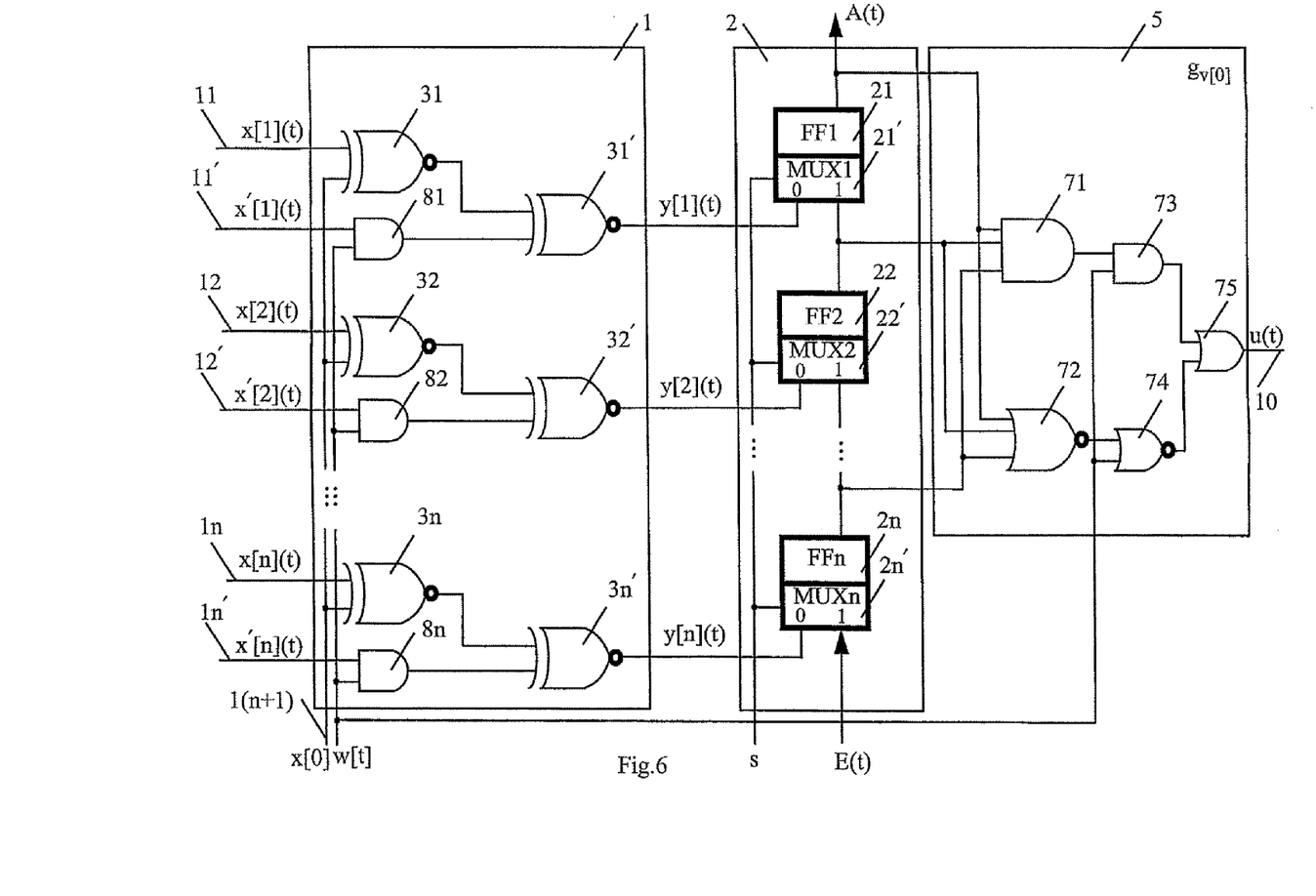
FIG. 6 depicts another embodiment of the other comparator, according to FIG. 2.

FIG. 6 depicts another embodiment of a comparator. FIG. 6 differs from FIG. 4 in that for k=1, . . . , in the line, carrying the signal x'[k](t), is run into the first input of a controlled gate with a determining value that is here an AND gate, at whose second input a control signal w[t] is present and whose output is connected to the second input of the XNOR gate 3k', at whose first input the output of the XNOR gate 3k is attached.

If at this stage the value of the control signal w(t) is chosen equal to the non-determining value, here equal to 1, the comparators of FIG. 4 and FIG. 6 are functionally equivalent. If the control signal w(t) is chosen equal to the determining value, here the value 0, then functionally for k=1, . . . , n only the input value x[k](t) at the input 1k of the comparator is routed to the 0-input of the multiplexer MUXk 2k' and stored in the flip-flop FFk 2k. If at this stage for the control value s of the controllable register the value 0 is chosen first for one cycle, and if then the value 1 is chosen for n cycles, the content of the register can be outputted in n cycles by way of the output of the flip-flop 21, said output carrying the output value A(t). This a feature can be advantageous for diagnosing the faulty value. This diagnosis can be done, for example, in the case, where the control value w[t] was equal to 0 and equal to 1. Then one can determine from the outputted first input value and from the outputted XOR sum of the two input values, in which of the monitored replicated systems and in which bit position an error in the functioning mode with on-line error detection was indicated.

The advantageous property of the comparator of assisting the diagnosis shall be explained here once again for the case, in which upon detecting that there is an error somewhere in one of the replicated monitored systems or in the comparator, a test is applied. In order to localize the error, a sequence of predetermined test inputs can be entered during test mode into the replicated system that is monitored by the comparator; and such a test input T(t1), for which an error is indicated at the output 10 of the comparator, can be selected.

The values, which are present at the inputs of the comparator 11, ..., 1n and 11', ..., 1n' when the test input T(t1) is entered into the replicated system to be monitored, are called x[1](t1), ..., x[n](t1) and x'[1](t1), ..., x'[n](t1). If at time t1 the control input w[t1]=0 is available at the comparator, then the values y[1](t1)=x[1](t1), ..., y[n](t1)=x[n](t1) are entered byway of the multiplexers MUX1 21', ..., MUXn 2n' into the flip-flops FF1 21, ..., FFn 2n and stored. These values can be outputted over the output of the controllable register 2 that carries the output value A(t), for evaluation purposes. If the input of the test input T(t1) in the replicated system to be monitored is repeated, and now the control input w[t1]=1 is present at the comparator, then the values x[1](t1) ⊕x'[1](t1), ... x[n](t1)⊕x'[n](t1) are entered into the flip-flops FF1 21, ..., FFn 2n and stored. At this stage these values can also be outputted over the output of the controllable register 2 that carries the output value A(t), for evaluation purposes.

Now a comparison of the outputted values that are actually obtained and the values that are expected in the error-free case makes it easy to diagnose which system was faulty. If at this stage only the values that were outputted from the controllable register 2 in the presence of the control input w[t1]=0 are faulty, then the first system to be monitored is faulty. If only the values that were outputted in the presence of the control input w[t1]=1 are faulty, then the second system to be monitored was faulty. The bit positions of the faulty values follow from the comparison with the values that are expected in the error-free case.

If the values that were outputted both in the presence of the control input w[t1]=0 and in the presence of the control input w[t1]=1 are faulty, then the comparator is faulty, if it can be assumed that only one of the systems is faulty.

The features of the invention that are disclosed in the above description, the claims and the drawings can be important both individually and also in any arbitrary combination for the realization of the invention in its many embodiments.

The invention claimed is:

1. A circuit comprising:
   a first combinatorial circuit configured to implement a combinatorial function f, wherein the first combinatorial circuit is configured to receive inputs x[1](t), ..., x[n](t) and x'[1](t), ..., x'[n](t), and to output y[1](t), ..., y[n](t), wherein the combinatorial function f determines outputs y[1](t), ..., y[n](t) such that outputs y[1](t), ..., y[n](t) are indicative of a bit-by-bit comparison of inputs x[1](t), ..., x[n](t) and x'[1](t), ..., x'[n](t);
   a controllable register, comprising:
      n flip-flops, FF1, ..., FFn, configured to assume binary states z[1](t), ..., z[n](t), and
      n multiplexers, MUX1, ..., MUXn each comprising:
         a first data input, wherein for j=1, ..., n the first data input of the multiplexer MUXj is connected to the j-th output y[j](t) from the first combinatorial circuit,
         a second data input, wherein for k=1, ..., n−1, the second data input of the multiplexer MUXk is the binary state z[k+1](t), and wherein the second data input of the multiplexer MUXn is an external signal E(t), and
         a first control input configured to carry a binary control signal s; and
   a second combinatorial circuit configured to implement a combinatorial function g, wherein the second combinatorial circuit is configured to receive binary states z[1](t), ..., z[n](t), and output a value u(t), wherein the combinatorial function g determines output u(t) as a function of binary states z[1](t), ..., z[n](t).

2. The circuit of claim 1, wherein the second combinatorial circuit is configured to implement a combinatorial function $g_{v[0]}$ and comprises:
   a second control input which is configured to carry a binary control signal v[0], wherein the second combinatorial circuit is further configured to implement a Boolean function with a determining value $c[g_{v[0]}]$ such that $c[g_0] \neq c[g_1]$.

3. The circuit of claim 1, wherein the second combinatorial circuit is configured to implement the function AND with a determining value c[AND]=0.

4. The circuit of claim 2 wherein:
   the second combinatorial circuit comprises a first AND gate with n inputs and a parallel connected first NOR gate with n inputs;
   an output of the first AND gate is connected to a first input of a second AND gate having two inputs and one output;
   an output of the first NOR gate is connected to a first input of a second NOR gate comprising two inputs and one output;
   the second control input of the circuit for implementing the function g is connected to a second input of the second AND gate and the second NOR gate;
   an output of the second AND gate is connected to a first input of an OR gate; and
   an output of the second NOR gate is connected to a second input of the OR gate, whose output forms an output of the second combinatorial circuit.

5. The circuit of claim 2, wherein the first combinatorial circuit is further configured to receive a binary control signal x[0], and wherein the binary control signal x[0] and the second control input are connected together directly or by means of an inverter.

6. The circuit of claim 1, wherein the data inputs x'[1](t), ..., x'[n](t) are each connected to a first input of a corresponding logic gate and a third control input is connected to a second input of each logic gate and wherein each logic gate is configured so that the corresponding data input is modified to a predetermined output determining value when the third control input is equal to the predetermined output value and the corresponding data input not modified when the third control input is not equal to the predetermined output value.

7. The circuit of claim 1, wherein in the controllable register a series connection of a multiplexer and a flip-flop element is formed as an integrated scan flip-flop.

8. The circuit of claim 1, wherein the first combinatorial circuit is further configured to receive a binary control signal x[0], and wherein the combinatorial function f determines outputs y[1](t), ..., y[n](t) as a function of inputs x[1](t), ..., x[n](t) and x'[1](t), ..., x'[n](t) and the binary control signal x[0].

9. The circuit of claim 8, wherein the combinatorial function f determines outputs y[1](t), ..., y[n](t) so that for j=1, ..., n, $$y[j](t) = x[j](t) \oplus x'[j](t) \oplus x[0] \oplus i[f]$$

holds true, where ⊕ is addition modulo 2 and i[f] is a binary constant.

10. A method comprising:
    receiving inputs x[1](t), ..., x[n](t) and x'[1](t), ..., x'[n](t) into a first combinatorial circuit for implementing a combinatorial function f to produce output y[1](t), ..., y[n] (t), wherein the combinatorial function f determines outputs y[1](t), ..., y[n](t) such that outputs y[1](t), ..., y[n](t) are indicative of a bit-by-bit comparison of inputs x[1](t), ..., x[n](t) and x'[1](t), ..., x'[n](t);

passing the outputs y[1](t), ..., y[n](t) to a controllable register to produce binary states z[1](t), ..., z[n](t), the controllable register comprising:
n flip-flops, FF1, ..., FFn, configured to assume binary states z[1](t), ..., z[n](t), and
n multiplexers, MUX1, ..., MUXn each comprising:
a first data input, wherein for j=1, ..., n the first data input of the multiplexer MUXj is connected to the j-th output y[j](t) from the first combinatorial circuit,
a second data input, wherein for k=1, ..., n−1, the second data input of the multiplexer MUXk is the binary state z[k+1](t), and wherein the second data input of the multiplexer MUXn is an external signal E(t), and
a first control input configured to carry a binary control signal s; and passing the binary states z[1](t), ..., z[n](t) to a second combinatorial circuit for implementing a combinatorial function g, wherein the second combinatorial circuit is configured to receive binary states z[1](t), ..., z[n](t), and output a value u(t), wherein the combinatorial function g determines output u(t) as a function of binary states z[1](t), ..., z[n](t).

11. The method of claim 10, wherein the second combinatorial circuit is configured to implement a combinatorial function $g_{v[0]}$ and comprises:
a second control input which is configured to carry a binary control signal v[0], wherein the second combinatorial circuit is further configured to implement a Boolean function with a determining value $c[g_{v[0]}]$ such that $c[g_0] \neq c[g_1]$.

12. The method of claim 10, wherein the second combinatorial circuit is configured to implement the function AND with a determining value c[AND]=0.

13. The method of claim 10, wherein the data inputs x'[1](t), ..., x'[n](t) are each connected to a first input of a corresponding logic gate and a third control input is connected to a second input of each logic gate and wherein each logic gate is configured so that the corresponding data input is modified to a predetermined output determining value when the third control input is equal to the predetermined output value and the corresponding data input not modified when the third control input is not equal to the predetermined output value.

14. The method of claim 10, wherein in the controllable register a series connection of a multiplexer and a flip-flop element is formed as an integrated scan flip-flop.

15. The method of claim 10, further comprising inputting a binary control signal x[0] into the first combinatorial circuit, wherein the combinatorial function f determines outputs y[1](t), ..., y[n](t) as a function of inputs x[1](t), ..., x[n](t) and x'[1](t), ..., x'[n](t) and the binary control signal x[0].

16. The method of claim 15, wherein the combinatorial function f determines outputs y[1](t), ..., y[n](t) so that for j=1, ..., n, $$y[j](t) = x[j](t) \oplus x'[j](t) \oplus x[0] \oplus i[f]$$

holds true, where $\oplus$ is addition modulo 2 and i[f] is a binary constant.

* * * * *